United States Patent
Kato

(10) Patent No.: US 11,741,193 B2
(45) Date of Patent: Aug. 29, 2023

(54) DISTANCE RECOGNITION SYSTEM FOR USE IN MARINE VESSEL, CONTROL METHOD THEREOF, AND MARINE VESSEL

(71) Applicant: YAMAHA HATSUDOKI KABUSHIKI KAISHA, Iwata (JP)

(72) Inventor: Takeshi Kato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/523,979

(22) Filed: Nov. 11, 2021

(65) Prior Publication Data
US 2022/0171987 A1 Jun. 2, 2022

(30) Foreign Application Priority Data
Dec. 2, 2020 (JP) .................................. 2020-200425

(51) Int. Cl.
*G06T 7/80* (2017.01)
*G06T 7/70* (2017.01)
(Continued)

(52) U.S. Cl.
CPC .............. *G06F 18/22* (2023.01); *G06T 7/70* (2017.01); *G06T 7/85* (2017.01); *G06V 20/10* (2022.01);
(Continued)

(58) Field of Classification Search
CPC ........... G06K 9/6215; G06T 7/85; G06T 7/70; G06T 2207/10012; G06V 20/10; G06F 18/22
See application file for complete search history.

(56) References Cited

U.S. PATENT DOCUMENTS 8,215,252 B1 * 7/2012 Chun ..................... B63B 39/08
440/51
2007/0263902 A1 * 11/2007 Higuchi ............... G05D 1/0246
382/104
(Continued)

FOREIGN PATENT DOCUMENTS

JP         2806451 B2    9/1998
JP     2020-104817 A    7/2020
(Continued)

OTHER PUBLICATIONS

Katada et al., "Proposal of Triangulation Method for Stereo Camera with Intersecting Optical Axes", Proceedings of IIAE Annual Conference 2014, Sep. 28, 2014, pp. 68 & 69.

*Primary Examiner* — Brian P Yenke
(74) *Attorney, Agent, or Firm* — Keating and Bennett, LLP

(57) ABSTRACT

A distance recognition system for use in a marine vessel includes at least one memory, and a first imaging unit and a second imaging unit both positioned on a hull so that their imaging areas include a water surface. The second imaging unit is higher than the first imaging unit. The distance recognition system further includes at least one processor coupled to the at least one memory and configured or programmed to acquire a first image and a second image captured by the first imaging unit and the second imaging unit, and perform a matching process between the first image and the second image to acquire distance information about any position in the first image.

14 Claims, 9 Drawing Sheets

(51) Int. Cl.
   *G06V 20/10* (2022.01)
   *G06F 18/22* (2023.01)
(52) U.S. Cl.
   CPC .............. *G06T 2207/10012* (2013.01); *G06T 2207/30252* (2013.01)

(56) References Cited

U.S. PATENT DOCUMENTS

| | | | |
|---|---|---|---|
| 2012/0293633 A1 | 11/2012 | Yamato | |
| 2016/0375963 A1* | 12/2016 | Tønnessen | G01V 1/38 701/21 |
| 2017/0318279 A1 | 11/2017 | Ohara | |
| 2017/0344844 A1* | 11/2017 | Sano | G06V 20/10 |
| 2018/0070487 A1* | 3/2018 | Takama | G06T 7/001 |
| 2018/0206370 A1* | 7/2018 | Takama | H05K 13/081 |
| 2018/0284802 A1* | 10/2018 | Tsai | G05D 1/0044 |
| 2019/0223272 A1* | 7/2019 | Pohl | B63G 8/001 |
| 2020/0050202 A1* | 2/2020 | Suresh | G06V 20/00 |
| 2020/0063708 A1* | 2/2020 | Grigg | B63B 21/50 |
| 2020/0089234 A1* | 3/2020 | Nishiyama | G06T 15/20 |
| 2020/0089957 A1* | 3/2020 | Nishiyama | G06T 7/73 |
| 2020/0090367 A1* | 3/2020 | Nishiyama | B63B 49/00 |
| 2020/0108774 A1* | 4/2020 | Hashimoto | G01B 11/00 |
| 2020/0253103 A1* | 8/2020 | Takama | H05K 13/0409 |
| 2020/0275036 A1* | 8/2020 | Kurokawa | B63B 79/40 |
| 2021/0035452 A1* | 2/2021 | Rodey | G01C 21/203 |
| 2021/0078681 A1* | 3/2021 | Stiglich | B63C 1/06 |
| 2021/0094665 A1* | 4/2021 | Schmid | B63H 25/46 |
| 2021/0214058 A1* | 7/2021 | Hine | H02S 20/30 |
| 2021/0253198 A1* | 8/2021 | Rosen | B63B 39/08 |
| 2021/0394877 A1* | 12/2021 | Kadota | G05D 13/66 |
| 2022/0060677 A1* | 2/2022 | Park | G06V 40/10 |
| 2022/0126959 A1* | 4/2022 | Ishii | G06T 7/292 |
| 2022/0185436 A1* | 6/2022 | Kaneshika | B63C 9/065 |
| 2022/0234490 A1* | 7/2022 | Traub | B60P 3/1066 |
| 2023/0078797 A1* | 3/2023 | Swanson | A01K 29/005 |

FOREIGN PATENT DOCUMENTS

| | | |
|---|---|---|
| JP | 2020-104818 A | 7/2020 |
| WO | 2011/096251 A1 | 8/2011 |
| WO | 2016/063545 A1 | 4/2016 |

\* cited by examiner

DISTANCE RECOGNITION SYSTEM FOR USE IN MARINE VESSEL, CONTROL METHOD THEREOF, AND MARINE VESSEL

CROSS REFERENCE TO RELATED APPLICATIONS

This application claims the benefit of priority to Japanese Patent Application No. 2020-200425 filed on Dec. 2, 2020. The entire contents of this application are hereby incorporated herein by reference.

BACKGROUND OF THE INVENTION

1. Field of the Invention

The present invention relates to distance recognition systems for use in marine vessels, control methods thereof, and marine vessels.

2. Description of the Related Art

In the field of automobiles, there are known techniques for detecting a distance to a detected object by using a stereo camera, as disclosed in WO 2016/063545. In the technique of WO 2016/063545, the distance to the detected object is detected by stereo matching between two images captured by two imaging units arranged side by side.

In the field of marine vessels, it is important to determine a water surface condition including wave height for operation of marine vessels. For example, it is conceivable to use a stereo camera disclosed in WO 2016/063545 to detect a relative distance between the camera and each wave. In typical stereo matching, triangulation is used for distance recognition. In the distance recognition, for example, one rectangle is cut out from a first image and a matching rectangle that matches the one rectangle is extracted from a search area in a second image. A search for the matching rectangle is conducted in the right-and-left direction since two imaging units are arranged side by side in the horizontal direction.

However, when waves on a water surface are considered as an example, the waves have fewer individual features than floating matter or other foreign objects on a water surface, and most waves are similar to each other. In particular, waves at the same distance from an observer may have no big difference in shape and size. Therefore, when the search is conducted in the right-and-left direction, rectangles covering almost the same distance are compared with each other, which makes extraction of a matching rectangle difficult. Accordingly, a distance to a freely-selected position within an imaging area is determined with less accuracy.

SUMMARY OF THE INVENTION

Preferred embodiments of the present invention provide distance recognition systems each able to more accurately recognize a distance to any position within an imaging area, control methods thereof, and marine vessels.

According to a preferred embodiment of the present invention, a distance recognition system for use in a marine vessel includes at least one memory, a first imaging unit, and a second imaging unit. The first imaging unit is positioned on a hull so that an imaging area of the first imaging unit includes a water surface, and the second imaging unit is positioned on the hull higher than the first imaging unit and so that an imaging area of the second imaging unit includes the water surface. The distance recognition system further includes at least one processor coupled to the at least one memory and configured or programmed to acquire a first image captured by either one of the first imaging unit or the second imaging unit, and a second image captured by the other one of the first imaging unit or the second imaging unit, and perform a matching process between the first image and the second image to acquire distance information about any position in the first image.

According to another preferred embodiment of the present invention, a control method of the above-described distance recognition system includes acquiring a first image captured by either one of the first imaging unit or the second imaging unit, and a second image captured by the other one of the first imaging unit or the second imaging unit, and performing a matching process between the first image and the second image to acquire distance information about any position in the first image.

According to another preferred embodiment of the present invention, a marine vessel includes a hull and the above-described distance recognition system.

According to preferred embodiments of the present invention, a distance recognition system includes a first imaging unit positioned on a hull so that an imaging area of the first imaging unit includes a water surface, and a second imaging unit positioned on the hull at a location higher than a location of the first imaging unit and so that an imaging area of the second imaging unit includes the water surface. In the distance recognition system, a first image and a second image captured by the first imaging unit and the second imaging unit are acquired, and a matching process between the first image and the second image is performed to acquire distance information about any position in the first image. As a result, the distance to any position in the imaging area is accurately determined.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
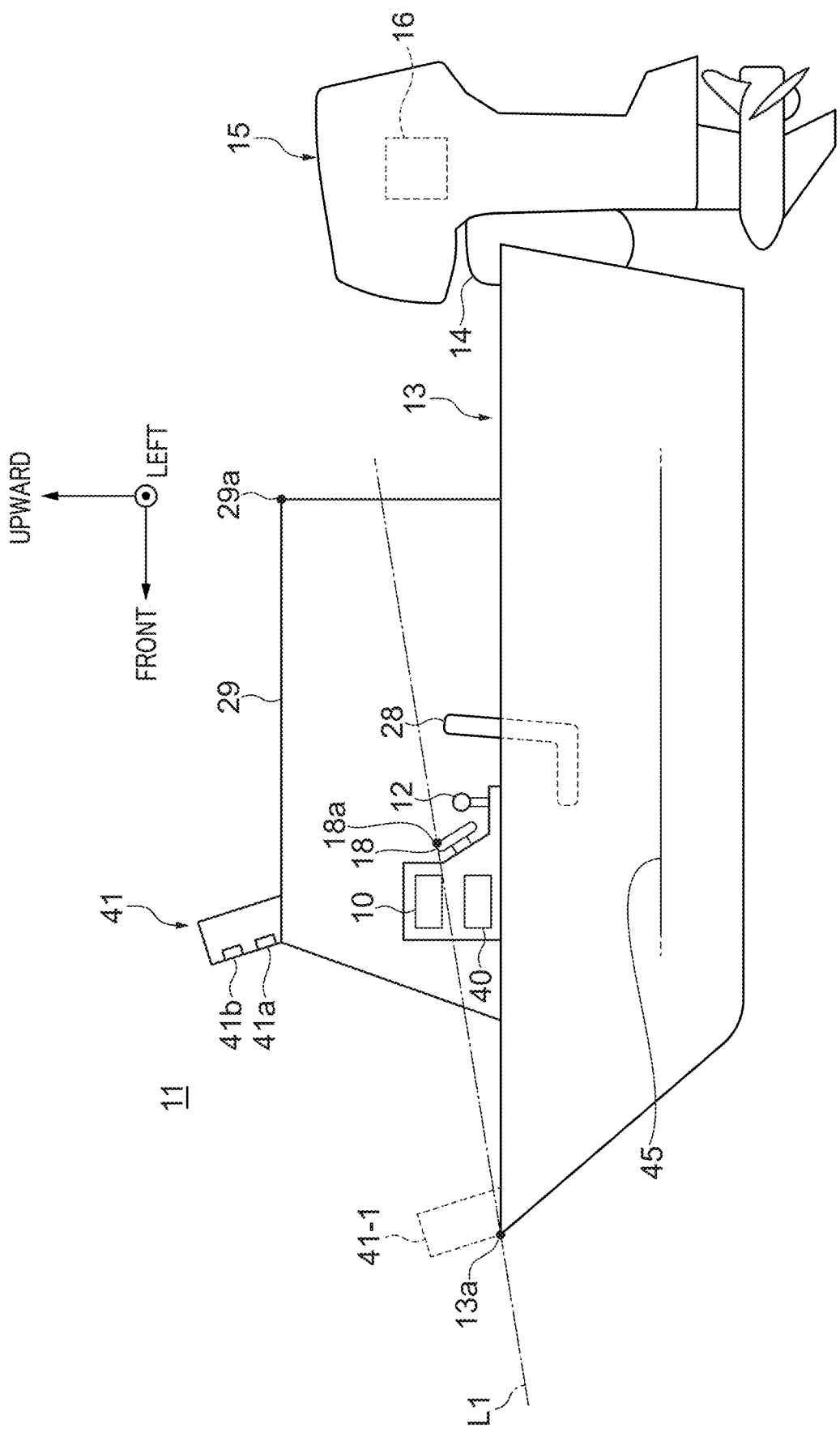
FIG. 1 is a schematic side view of a marine vessel to which a distance recognition system is provided.

FIG. 1 is a schematic side view of a marine vessel to which a distance recognition system according to a preferred embodiment of the present invention is provided. The marine vessel 11 includes a hull 13 and an outboard motor 15 which defines and functions as a marine propulsion device mounted on the hull 13. The number of the outboard motors 15 provided on the hull 13 is not limited. The hull 11 is provided with a cabin 29, in which a central unit 10, a subunit 40, a steering wheel 18, and a throttle lever 12 are provided near a maneuvering seat 28.

In the following description, front (or forward), rear, left, right, up, and down directions respectively refer to front, rear, left, right, up, and down directions of the hull 13. The right-and-left direction is defined with reference to the view of the hull 13 from the rear. The vertical direction is perpendicular to the front-and-rear direction and the right-and-left direction. The vertical direction is perpendicular to an upper surface of a deck 45 of the hull 13.

The outboard motor 15 is mounted on the hull 13 via a mounting unit 14. The outboard motor 15 includes an engine 16 which defines and functions as an internal combustion engine. The outboard motor 15 generates a thrust force to move the hull 13 by a propeller being rotated by a driving force of the engine 16. The mounting unit 14 includes a swivel bracket, a clamp bracket, a steering shaft and a tilt shaft (none of which are illustrated). The mounting unit 14 further includes a power trim and tilt mechanism (PTT mechanism) 27 (refer to FIG. 2). The PTT mechanism 27 turns the outboard motor 15 about the tilt shaft. This makes it possible to change inclination angles (trim angle and tilt angle) of the outboard motor 15 with respect to the hull 13, and thus the trim is adjusted and the outboard motor 15 is tilted up and down. The outboard motor 15 is able to turn about the steering shaft with respect to the swivel bracket. Operating the steering wheel 18 causes the outboard motor 15 to turn in the right-and-left direction, thus maneuvering the marine vessel 11.

A stereo camera 41 is installed in the upper front portion of the cabin 29. The stereo camera 41 is attached to the cabin 29 directly or via a support. The stereo camera 41 is located in front of the maneuvering seat 28 and at a location higher than a location of the maneuvering seat 28. The stereo camera 41 includes a first camera 41a (a first imaging unit) and a second camera 41b (a second imaging unit), which define a pair of imaging units. Imaging directions of the first camera 41a and the second camera 41b are both directed substantially forward of the hull 13.

A straight line passing through the upper end 13a of a bow of the hull 13 and the upper end 18a of the steering wheel 18 is defined as a virtual straight line L1. In the vertical direction, both the cameras 41a and 41b are located in an area above the virtual straight line L1 when viewed from a side (the right or left side) of the hull 13. Both the cameras 41a and 41b are located in the front of and above the upper rear end 29a of the cabin 29. In the front-and-rear direction, both the cameras 41a and 41b are located in the front two-thirds of the hull 13, in other words, in front of an area extending from the rear end of the hull 13 by one third of the total length of the hull 13.

Figure 2:
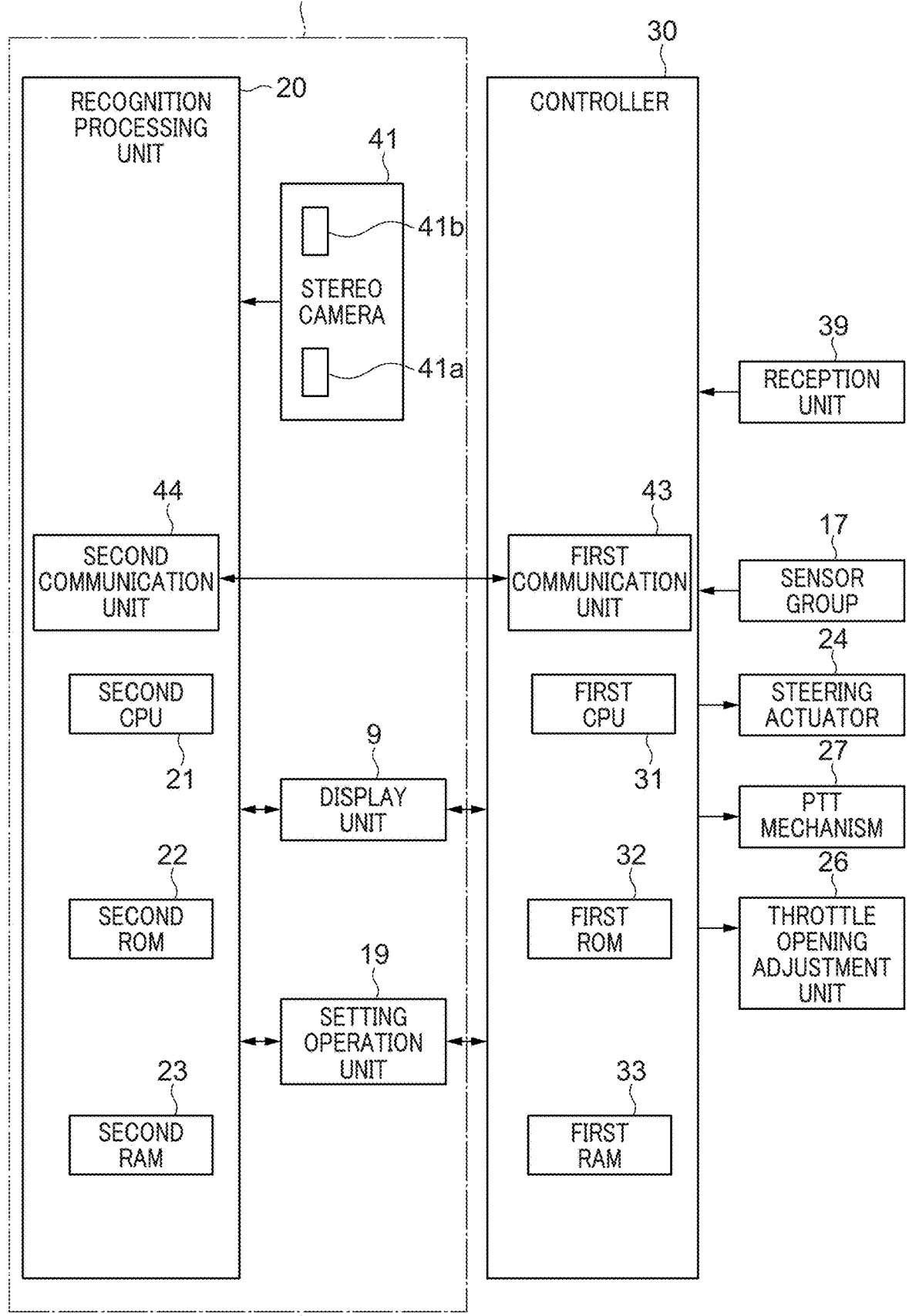
FIG. 2 is a block diagram of a maneuvering system.

FIG. 2 is a block diagram of a maneuvering system. The maneuvering system includes a distance recognition system 100. The distance recognition system 100 includes a recognition processing unit 20, the stereo camera 41, a display unit 9, and a setting operation unit 19. Note that the entire maneuvering system may be referred to as the distance recognition system 100.

The marine vessel 11 includes a controller 30, a sensor group 17, a reception unit 39, the display unit 9, the setting operation unit 19, a steering actuator 24, a PTT mechanism 27, and a throttle opening adjustment unit 26 as components mainly related to maneuvering.

The controller 30, the sensor group 17, the throttle opening adjustment unit 26, the reception unit 39, the display unit 9, and the setting operation unit 19 are included in the central unit 10 or located in a vicinity of the central unit 10. The display unit 9 and the setting operation unit 19 may be included in the subunit 40 instead of the central unit 10. Alternatively, each of the central unit 10 and the subunit 40 may individually include the display unit 9 and the setting operation unit 19. The sensor group 17 includes a throttle sensor, a throttle opening sensor, a steering angle sensor, a hull speed sensor, a hull acceleration sensor, a posture sensor, and an engine rpm sensor (none of which are illustrated). The throttle opening sensor and the engine rpm sensor are provided in the outboard motor 15. The steering actuator 24 and the PTT mechanism 27 are provided for the outboard motor 15.

The controller 30 includes a first communication unit 43, a first CPU 31, a first ROM 32 and a first RAM 33, and a timer which is not illustrated. The first ROM 32 stores control programs. The first CPU 31 loads the control programs stored in the first ROM 32 into the first RAM 33 and executes the control programs to implement various types of control processes. The first RAM 33 provides a work area for the first CPU 31 to execute the control programs. The first communication unit 43 communicates with the recognition processing unit 20 in a wired or wireless manner.

Detection results by the sensor group 17 are supplied to the controller 30. The throttle lever 12 (FIG. 1) is a throttle operator that a vessel operator uses to manually adjust a throttle opening degree. The throttle sensor in the sensor group 17 detects an operation position of the throttle lever 12. The throttle opening sensor detects the opening degree of a throttle valve which is not illustrated. The throttle opening adjustment unit 26 adjusts the opening degree of the throttle valve. During normal control other than automatic maneuvering, the first CPU 31 controls the throttle opening adjustment unit 26 according to the operation position of the throttle lever 12. The steering angle sensor detects the turning angle of the steering wheel 18. The hull speed sensor and the hull acceleration sensor respectively detect the speed and acceleration of navigation of the marine vessel 11 (hull 13).

The posture sensor includes, for example, a gyro sensor and a magnetic azimuth sensor. Using signals output from the posture sensor, the controller 30 calculates a roll angle, a pitch angle, and a yaw angle of the hull 13. The reception unit 39 includes a GNSS (Global Navigation Satellite Systems) receiver module like a GPS, and has a function of receiving GPS signals or various types of signals as positional information. Signals received by the reception unit 39 are supplied to the first CPU 31. The engine rpm sensor detects the number of rotations per unit time of the engine 16. The display unit 9 displays various types of information. The setting operation unit 19 includes an operator that a vessel operator uses to perform operations relating to maneuvering, a PTT operating switch, a setting operator that a vessel operator uses to make various settings, and an input operator that a vessel operator uses to input various types of instructions (none of which are illustrated).

The steering actuator 24 turns the outboard motor 15 in the right-and-left direction with respect to the hull 13. Turning the outboard motor 15 changes a direction in which a propulsive force acts on the hull 13. The PTT mechanism 27 tilts the outboard motor 15 with respect to the clamp bracket by turning the outboard motor 15 about the tilt shaft.

The PTT mechanism 27 is activated in response to, for example, operation of the PTT operation switch. As a result, the PTT mechanism 27 changes the inclination angle of the outboard motor 15 with respect to the hull 13. The controller 30 may control the engine 16 via an outboard motor ECU (which is not illustrated) provided in the outboard motor 15.

The recognition processing unit 20 is included in the subunit 40. The recognition processing unit 20 includes a second communication unit 44, a second CPU 21, a second ROM 22 and a second RAM 23, and a timer which is not illustrated. The recognition processing unit 20 and the controller 30 are communicably connected to each other via the second communication unit 44 and the first communication unit 43. The type of communication protocol between the recognition processing unit 20 and the controller 30 is not limited, but for example, a control area network (CAN) protocol may be used. The first CPU 31 communicates with the second CPU 21 to exchange information. The second ROM 22 stores control programs. The second CPU 21 loads the control programs stored in the second ROM 22 into the second RAM 23 and executes the control programs to implement various types of control processes. The second RAM 23 provides a work area for the second CPU 21 to execute the control programs. The display unit 9 and the setting operation unit 19 are connected not only to the controller 30 but also to the recognition processing unit 20.

Figure 3:
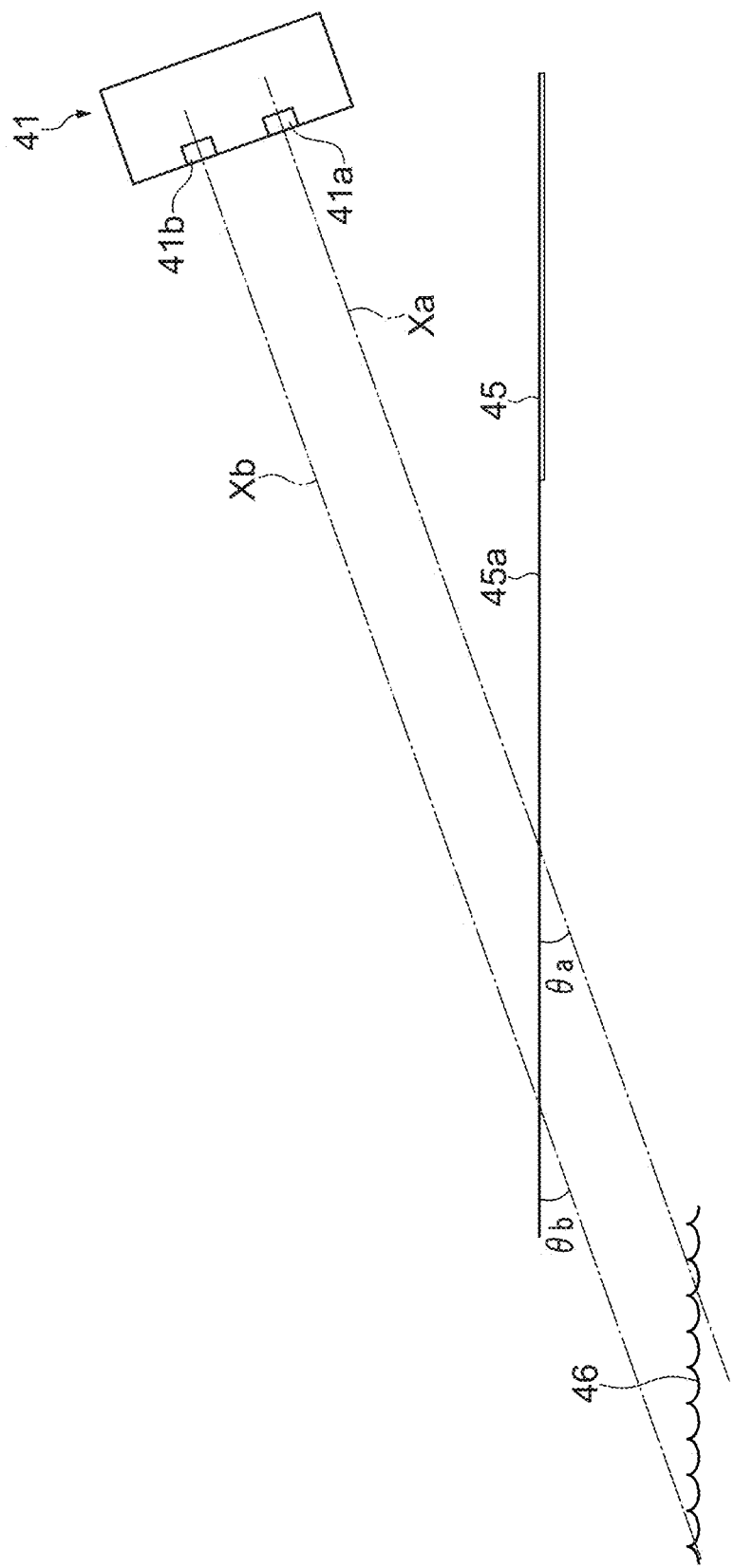
FIG. 3 is a schematic view illustrating an arrangement and an imaging direction of a stereo camera.

FIG. 3 is a schematic view illustrating an arrangement and an imaging direction of the stereo camera 41. The second camera 41b is arranged at a location higher than the first camera 41a. A view angle and an imaging direction of each camera are set so that a water surface 46 is included in both an imaging area of the first camera 41a and an imaging area of the second camera 41b during planing of the marine vessel 11. Moreover, the first camera 41a and the second camera 41b are oriented so that their imaging areas substantially overlap with each other. The images captured by the cameras 41a and 41b are supplied to the second CPU 21. The images captured by the cameras 41a and 41b are respectively referred to as a first image and a second image.

An optical axis Xa of an imaging lens of the first camera 41a and an optical axis Xb of an imaging lens of the second camera 41b are substantially parallel to each other. The optical axis Xa and a surface 45a parallel to the deck 45 defines an acute angle θa below the surface 45a and that is on a far side in the imaging direction (the subject side). Similarly, the optical axis Xb and the surface 45a parallel to the deck 45 defines an acute angle θb below the surface 45a and that is on a far side in the imaging direction (the subject side). When the deck 45 is horizontal, the optical axes Xa and Xb cut through the water surface 46. Therefore, even when the posture of the hull 13 changes, the water surface 46 is likely to enter the imaging areas. In consideration of the posture change of the hull 13, it is desirable that the acute angles θa and θb are set to values greater than zero degrees and smaller than about 20 degrees, for example. As an example, in order to recognize a wave 20 m ahead when the stereo camera 41 is located at a height of about 1.7 m above the water surface 46, it is desirable that the acute angles θa and θb are set to 15 to 20 degrees, for example.

The acute angles θa and θb may be greater than 20 degrees. The reason for this is, for example, there are cases in which the stereo camera 41 is installed at a high location on the hull 13 and it is desired to look down on the waves around the hull 13 from the high location. Therefore, the acute angles θa and θb are usually set to a value greater than zero degrees and less than about 60 degrees, for example, preferably greater than zero degrees and less than about 40 degrees, for example, and more preferably greater than zero degrees and less than about 20 degrees, for example.

The location of the first camera 41a and the location of the second camera 41b in the direction of the optical axis Xa are substantially coincident with each other. That is, the locations of imaging surfaces of the cameras 41a and 41b in the direction of the optical axis Xa are substantially coincident with each other. In a direction perpendicular to a direction perpendicular to the deck 45 (the vertical direction of the hull 13) and to the direction of the optical axis Xa (in the right-and-left direction of the hull 13 in a configuration example illustrated in FIG. 3, that is, the depth direction of the paper of FIG. 3), the location of the first camera 41a is substantially coincident with the location of the second camera 41b. In other words, when viewed from the front side, the cameras 41b and 41a are lined up or arranged vertically. This arrangement is useful to reduce the load of calculating distance information, which will be described below.

The second CPU 21 functions as an image acquisition unit in cooperation with mainly the second ROM 22, the second RAM 23, the second communication unit 44, and the timer which is not illustrated. The second CPU 21 as the image acquisition unit acquires the first image captured by the first camera 41a and the second image captured by the second camera 41b. The second CPU 21 further functions as a processing unit in cooperation with mainly the second ROM 22, the second RAM 23, the second communication unit 44, and the timer which is not illustrated. Although details will be described below, the second CPU 21 as the processing unit acquires distance information about any position in the first image (relative distance from the stereo camera 41) by performing the matching process between the first image and the second image.

Figure 4B:
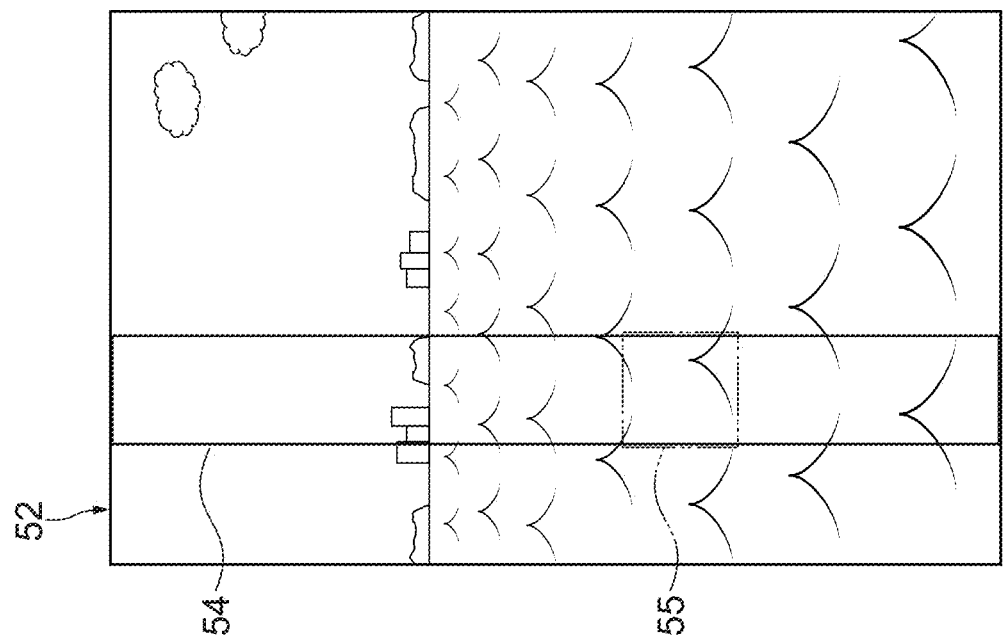
FIGS. 4A and 4B are conceptual diagrams of a first image and a second image.
Figure 4A:
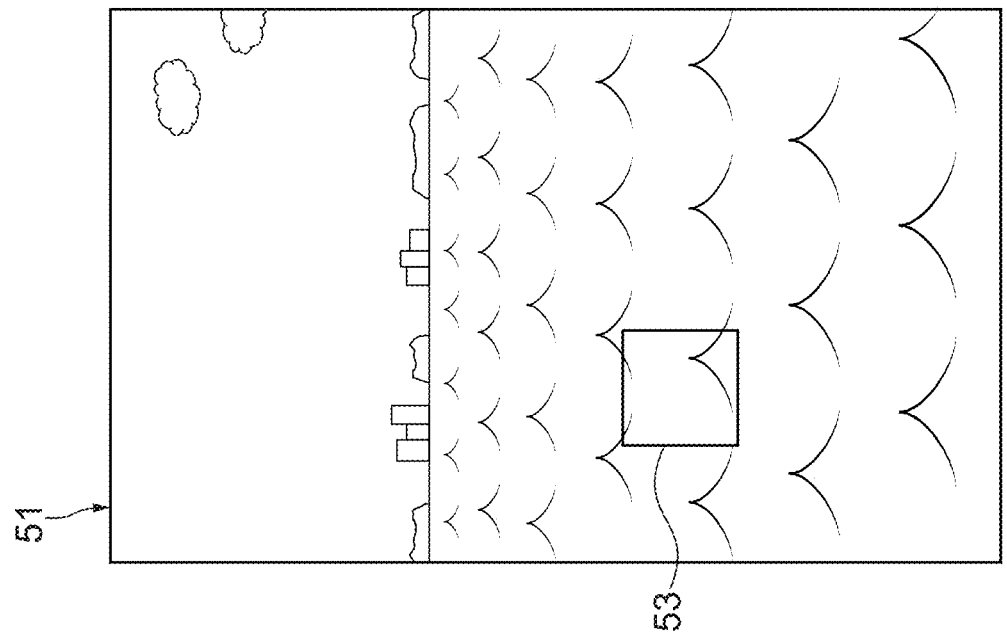

FIGS. 4A and 4B are respectively conceptual diagrams of the first image and the second image. A first image 51 and a second image 52, which are respectively illustrated in FIGS. 4A and 4B, correspond to image frames acquired at the same time.

A description is now provided of the matching process to acquire the distance information about any position in the first image 51. For the matching process, a known method of stereo matching using a sum of absolute difference (SAD) function as disclosed in WO 2016/063545 may be used.

In the matching process, the second CPU 21 defines a reference area 53 in the first image 51. As an example, the reference area 53 is a rectangular pixel block for a predetermined number×predetermined number of pixels. The second CPU 21 then executes a distance information acquisition process. In the distance information acquisition process, the second CPU 21 acquires the distance information of a predetermined position (for example, the center position) in the present reference area 53. Next, the second CPU 21 defines the next reference area 53 at a position where the present reference area 53 is shifted by a predetermined number of pixels, and executes the distance information acquisition process for the next reference area 53. In this way, the second CPU 21 executes the distance information acquisition process for a plurality of reference areas 53 that are sequentially set, so that the distance to any position in the imaging area is determined.

Figure 5:
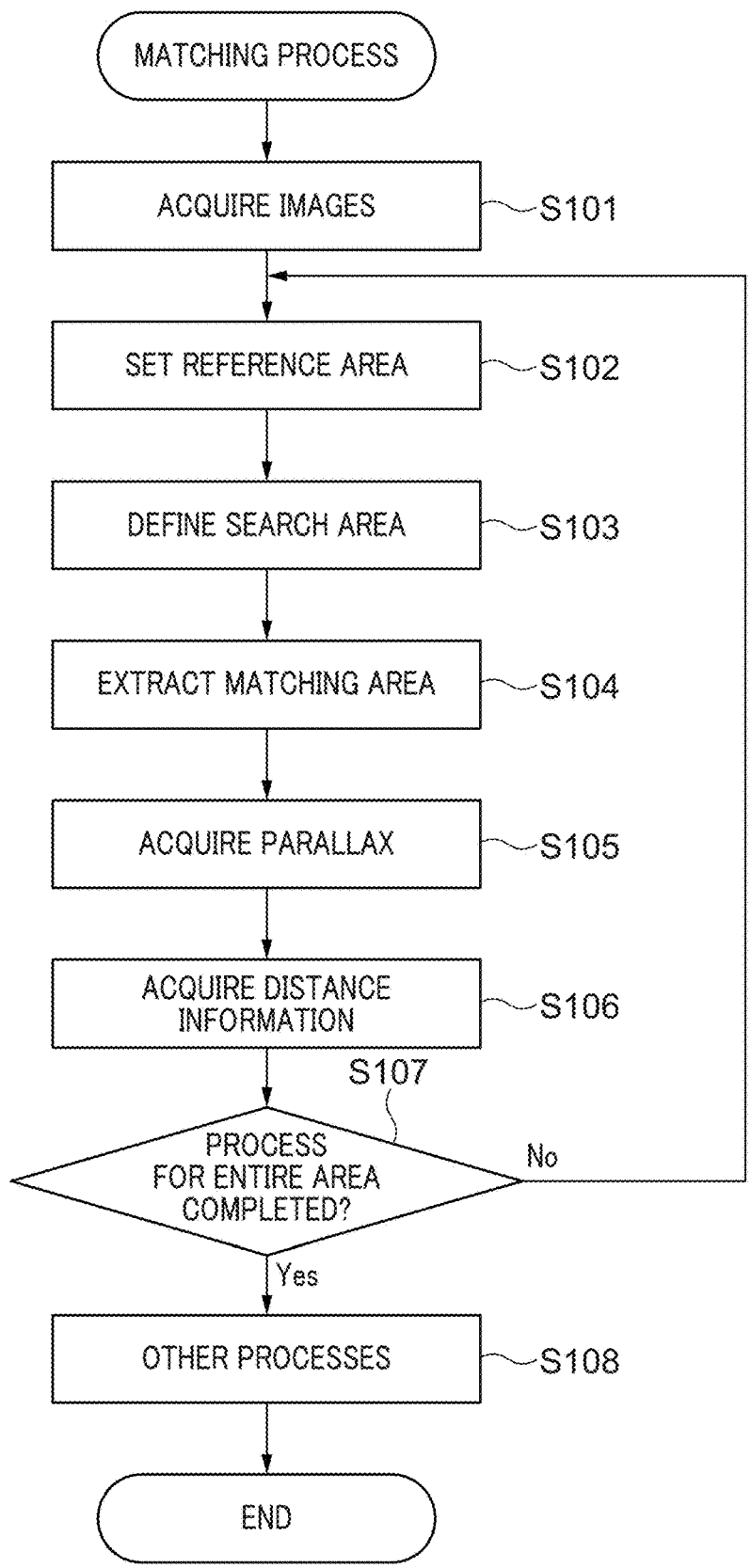
FIG. 5 is a flowchart illustrating a matching process.

A description is now provided of the matching process including the distance information acquisition process with reference to FIGS. 4A, 4B, 5, and 6. FIG. 5 is a flowchart illustrating the matching process. The matching process is implemented by the second CPU 21 loading a program stored in the second ROM 22 into the second RAM 23. The second CPU 21 starts the matching process in response to receiving an instruction from a vessel operator. Alternatively, the second CPU 21 may start the matching process in response to activation of the maneuvering system.

In Step S101, the second CPU 21 as the image acquisition unit acquires the first image 51 and the second image 52 captured by the first camera 41a and the second camera 41b, respectively. In Step S102, the second CPU 21 sets the reference area 53 in the first image 51 as described above (refer to FIG. 4A). In Steps S103 to S106, the second CPU 21 as the processing unit executes the distance information acquisition process.

In Step S103, the second CPU 21 uses the position and size of the reference area 53 to define a search area 54 in the second image 52 (refer to FIG. 4B). The longitudinal direction of the search area 54 is a direction corresponding to the direction in which the first camera 41a and the second camera 41b are arrayed, and the width of the search area 54 is the same as the width of the reference area 53. In the present preferred embodiment, the first camera 41a and the second camera 41b are arrayed or lined up substantially vertically, and thus the search area 54 includes a rectangular area corresponding to the reference area 53 and extends in the second image 52 substantially in the vertical direction on pixel coordinates. Strictly speaking, the longitudinal direction of the search area 54 is set to a direction of the epipolar line.

Next, in Step S104, the second CPU 21 scans the search area 54 in the second image 52 in the longitudinal direction, and extracts from the search area 54 an area (referred to as a matching area 55) that matches the reference area 53 (refer to FIG. 4B). Accordingly, in the second image 52, the matching area 55 is determined as a pixel block in which the same object as the object imaged in the reference area 53 is imaged.

Next, in Step S105, the second CPU 21 acquires a parallax between corresponding feature points of the reference area 53 and the matching area 55. In Step S106, the second CPU 21 uses the acquired parallax to acquire a distance to the feature points as distance information about the present reference area 53 by a known principle of triangulation.

Figure 6:
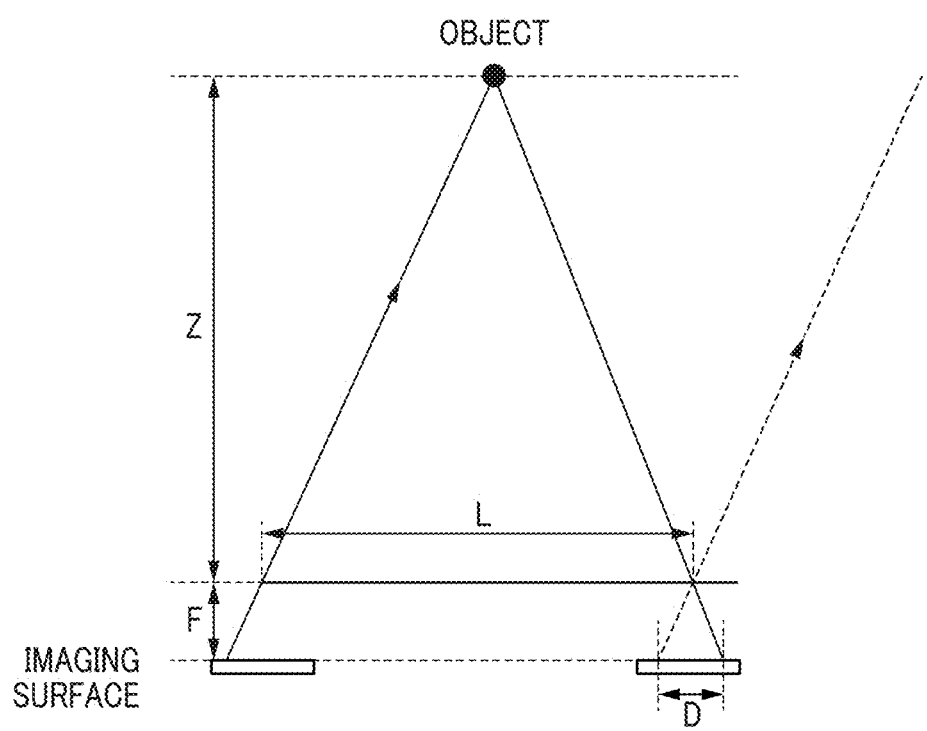
FIG. 6 is a schematic diagram illustrating a principle of triangulation.

FIG. 6 is a schematic diagram illustrating the principle of triangulation. The distance between the cameras 41a and 41b in terms of optical axes (the distance between the optical axis Xa and the optical axis Xb) is defined as a base length L. A focal distance of the imaging lenses of the cameras 41a and 41b is defined as F. The displacement amount of a point in the second image 52, which corresponds to a certain point in the first image 51, with respect to the certain point in the first image 51 is defined as a parallax D on an imaging surface. It is assumed that the focal distance, the number of pixels of an imaging element, and the size of one pixel are the same between the cameras 41a and 41b. It is assumed that the positions of the imaging surfaces of the cameras 41a and 41b in the direction of the optical axis Xa are substantially coincident with each other. A distance Z from the lens centers of the cameras 41a and 41b to the object is derived from mathematical expression (1) based on the principle of triangulation.

$$Z = L \times F / D \quad (1)$$

After that, the second CPU 21 generates, from the parallax D, a distance image including distance data. The second CPU 21 acquires distance information of the center position of the present reference area 53 from the distance image.

In Step S107, the second CPU 21 determines whether or not the distance information acquisition process for the entire area in the first image 51 has been completed. As a result of the determination, when the distance information acquisition process for the entire area in the first image 51 is not completed, the second CPU 21 returns the process to Step S102. When the distance information acquisition process for the entire area in the first image 51 has been completed, the second CPU 21 executes other processes in Step S108, and then ends the processes illustrated in FIG. 5.

In the "other processes," the second CPU 21 executes, various kinds of processes corresponding to settings or operations provided through the setting operation unit 19. When receiving an instruction to end the maneuvering system, the second CPU 21 ends the processes of the present flowchart. The "other processes" may include a process of transmitting the distance information acquired in Step S106 to the controller 30.

In stereo cameras typically used in the field of automobiles, two imaging units are arranged side by side, and thus the search area extends in the right-and-left direction. If, in the present preferred embodiment, the two cameras 41a and 41b are arranged side by side and the search area 54 extending in the right-and-left direction is set, it decreases extraction accuracy of the matching area 55. This is because it is not easy to discriminate between similar waves that are at the same distance. However, in the present preferred embodiment, the cameras 41a and 41b are arranged substantially vertically, and the search area 54 is set to extend substantially in the vertical direction, which results in increased extraction accuracy of the matching area 55. This is because waves vary in size according to distance, so it is relatively easy to discriminate between waves at different distances.

By the way, the recognition processing unit 20 may recognize the water surface condition based on the acquired distance information. For example, the recognition processing unit 20 may determine existence of waves from distances at several positions in the image, and recognize the water surface condition from heights of a plurality of waves determined to exist. In this case, the recognition processing unit 20 may determine the condition of the waves based on a wave having the maximum height among a plurality of the waves or based on an average height of the plurality of the waves.

For example, in the other processes of Step S108, the second CPU 21 may integrate the acquired distance information and shape information of detected objects to grasp the shapes of waves and output the result. Further, the second CPU 21 may measure a height of a water surface at a predetermined distance from the hull 13 based on the distance information, and when the height of the water surface changes exceeding a threshold value for a predetermined period of time (for example, several seconds), the second CPU 21 may output a notification indicating the change of the water surface height. Such an operation is implemented by, for example, the following processes.

First, the second CPU 21 acquires the distance image and then estimates a reference level of the water surface by the least-squares method. Here, the "reference level" indicates a height of the water surface (water surface position when assuming that there is no wave and the water surface is flat) in an entire area included in the image. Next, the second CPU 21 corrects the distance image by using the reference level. Next, the second CPU 21 cuts out from the distance image a portion indicating the water surface at a predetermined distance (for example, 5 m) from the hull 13, and calculates an average value or a median value of the height of the water surface in an area corresponding to the portion cut out from the distance image. Then, when judging, from logs of past water surface height, that the water surface height suddenly becomes higher than the threshold value, the second CPU 21 causes the display unit 9 to display the above notification.

The first CPU 31 of the controller 30 may recognize the water surface condition based on the distance information received from the distance recognition system 100.

The second CPU 21 may cause the display unit 9 to display information so as to make a vessel operator visually recognize the acquired distance information. The second CPU 21 is able to selectively set, according to an instruction from a vessel operator, one of operation modes of a distance information acquisition mode in which the distance information acquisition process is executed, and a normal mode in which the distance information acquisition process is not executed. The second CPU 21 controls the display unit 9 as follows according to the selected mode.

As an example, during the normal mode, the second CPU 21 causes the display unit 9 to display the first image 51. During the distance information acquisition mode, the second CPU 21 causes the display unit 9 to display the first image 51, and when informing that the water surface height becomes higher than the threshold value, the second CPU 21 causes the display unit 9 to further display a message or a mark superimposed on the first image 51. In any of the modes, the second CPU 21 may cause the display unit 9 to display the first image 51 and the second image 52 side by side on separate screens. Alternatively, a monitor may be provided separate from the display unit 9, and the second CPU 21 may cause one of the display unit 9 or the monitor to display the first image 51 and cause the other to display the second image 52. The above notification may be displayed on a separate screen, not in a superimposed manner. A windshield or the like may be used as the monitor separate from the display unit 9.

According to a preferred embodiment of the present invention, in the stereo camera 41 disposed on the hull 13, the second camera 41b is located at a location higher than the first camera 41a. The matching process between the first image 51 and the second image 52 is performed so as to acquire the distance information about any position in the first image 51. With these features, the distance to any position in the imaging area is more accurately determined.

According to a preferred embodiment of the present invention, the locations of the cameras 41a and 41b are substantially coincident with each other in the direction of the optical axis Xa and the right-and-left direction of the hull 13, which reduces the load of calculating the distance information. Further, the distance information is acquired with high accuracy because the optical axis Xa and the optical axis Xb are substantially parallel to each other.

Since the imaging direction of the camera 41a and/or the imaging direction of the camera 41b is substantially forward of the hull 13, distances in the likely traveling direction of the hull 13 are accurately determined. The stereo camera 41 is located in an area above the virtual straight line L1 passing through the upper end 13a of the bow of the hull 13 and the upper end 18a of the steering wheel 18 when viewed from a side of the hull 13, and the optical axis Xa and the surface 45a defines the acute angle θa below the surface 45a on a far side in the imaging direction. These makes recognition of the water surface condition easy.

The stereo camera 41 may be installed at the front of the hull 13 (for example, at the location 41-1 illustrated in FIG. 1). In this case, the stereo camera 41 may be attached, for example, to a bow rail (which is not illustrated) directly or via a support. Alternatively, when it is desired to acquire a distance to a position at a side of the hull 13, the stereo camera 41 may be located on a side of the hull 13 instead of the front of the hull 13.

Figure 7:
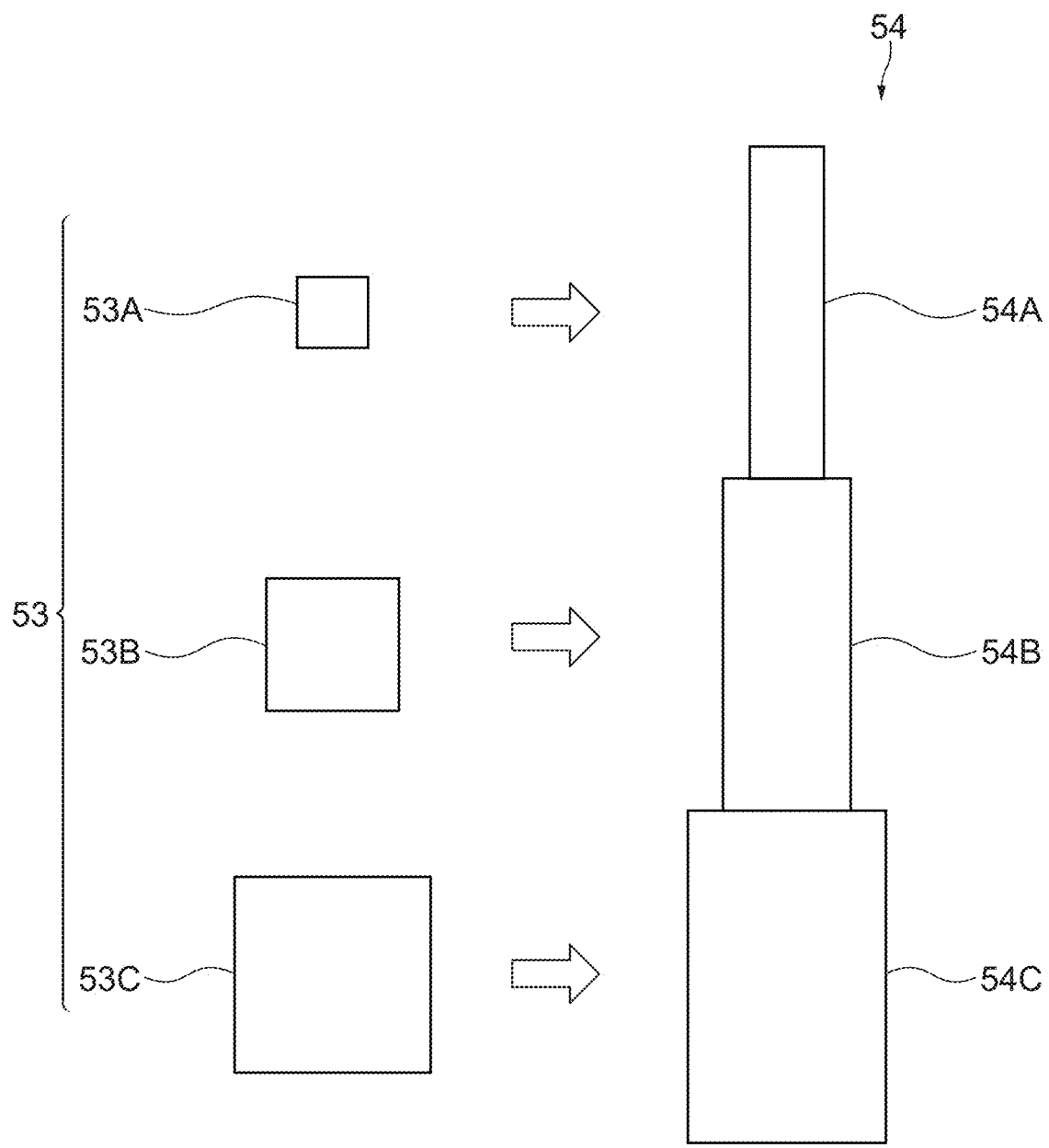
FIG. 7 is a schematic diagram illustrating a variation of the matching process.
Figure 8:
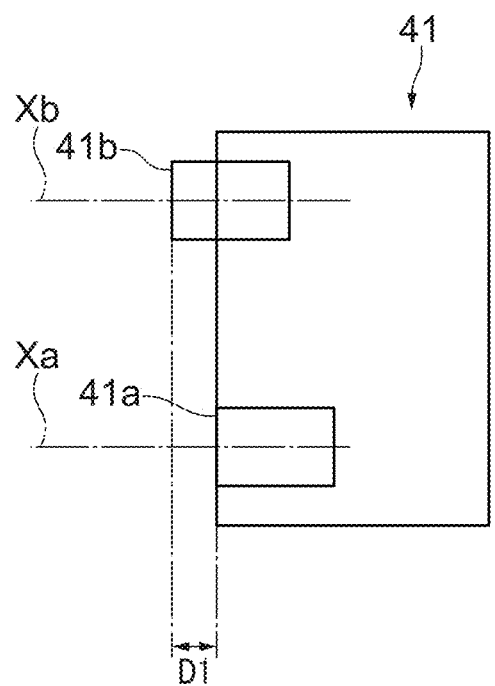
FIG. 8 is a schematic diagram illustrating a variation of a stereo camera.
Figure 9:
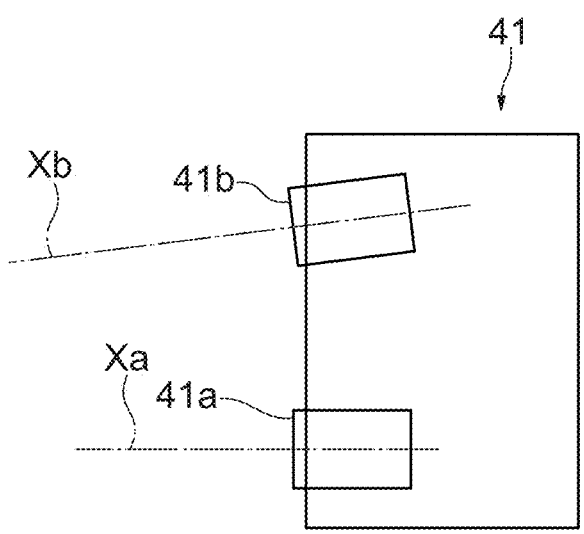
FIG. 9 is a schematic diagram illustrating a variation of a stereo camera.

FIGS. 7 to 9 illustrate variations of preferred embodiments of the present invention.

FIG. 7 is a schematic diagram illustrating a variation of the matching process. In the above description using FIGS. 4A and 4B, the reference areas 53 that are sequentially set have the same shape and size. However, the matching process is not limited to this. The reference areas 53 may change in size according to regions in the first image 51, and the shape and size of the search area 54 set in the second image 52 may change according to the size of the reference area 53, which is referred to as the first method.

For example, in a case where the cameras 41b and 41a are arranged substantially vertically as illustrated in FIG. 3, the reference areas 53 may be decreased in size as they are in a region in the first image 51 corresponding to a longer distance from the stereo camera 41, as illustrated in FIG. 7. A region at a higher position in the first image 51 corresponds to a region farther from the stereo camera 41. The first image 51 is divided into, for example, three regions of the upper region, the middle region, and the lower region from the top of the first image 51. The second CPU 21 sets reference areas 53A in the upper region. The second CPU 21 sets the same reference areas 53A in the upper region even if they are at different positions in the right-and-left direction in the same upper region. Similarly, the second CPU 21 sets reference areas 53B in the middle region and sets reference areas 53C in the lower region. The reference areas 53A, 53B, and 53C are formed in rectangles similar to each other, but the size of the reference areas 53C is larger than that of the reference areas 53B, the size of the reference areas 53B is larger than that of the reference areas 53A, and the reference areas 53A is the smallest. In other words, the second CPU 21 decreases in size the reference areas 53 set in the first region of the first image 51 in comparison with the reference areas 53 set in the second region which is located below the first region in the first image 51.

When setting the search area 54 in the second image 52, the second CPU 21 sets the width of the search area 54 to be the same as the width of the reference area 53A in the upper region, the width of the reference area 53B in the middle region, and the width of the reference area 53C in the lower region. The longitudinal direction of the search area 54 is the vertical direction in the second image 52. The reason for changing the size of the reference areas in this way is that a distance distribution included in an image portion of the same size becomes wider as the image portion is in a region corresponding to the longer distance from the stereo camera 41. That is, the reference areas 53A in a region corresponding to the longer distance is decreased in size so as to prevent the distance distribution included in the reference areas 53A from being wider. It enhances the accuracy of the acquired distance information, and the distance to any position in the imaging area is more accurately determined.

The process of decreasing the size of the reference areas 53 in the region at the higher position in the first image 51 is not limited to a case in which the cameras 41b and 41a are lined up in the substantially vertical direction as illustrated in FIG. 3. That is, the above process can be used at least when the second camera 41b is arranged in a location higher than the first camera 41a.

The same effect can be obtained by not changing the shape and size of the reference areas 53 and the search area 54 but changing the size of corresponding image portions in the matching process, which is referred to as the second method. That is, image portions corresponding to the reference areas 53 may change in size according to the regions of the first image 51, and an image portion corresponding to the search area 54 may change in shape and size according to the sizes of the image portions corresponding to the reference areas 53.

For example, the reference areas 53 are set to the same size in any of the upper region, the middle region, and the lower region of the first image 51. In the second image 52, the width of the search area 54 is constant and the same as the width of the reference areas 53. On the other hand, the image portions corresponding to the reference areas 53 in the upper region, the middle region, and the lower region of the first image 51 are changed in size so that those in the upper region are larger in size than those in the middle region and those in the middle region are larger in size than those in the lower region. That is, the image portions corresponding to the reference areas 53 in a more distant region are further increased in size. At the same time, the image portion corresponding to the search area 54 in the second image 52 is changed in size in the upper region, the middle region, and the lower region according to the sizes of image portions in the upper region, the middle region, and the lower region of the first image 51. That is, the image portions corresponding to the reference areas 53 in a more distant region is further increased in size so as to prevent the distance distribution included in the reference areas 53 from being wider. It enhances the accuracy of the acquired distance information, and the distance to any position in the imaging area is more accurately determined.

The first method and the second method may be used in combination.

FIGS. 8 and 9 are schematic diagrams illustrating variations of the stereo camera 41. The relative locations of the cameras 41a and 41b and the angles of the optical axes Xa and Xb can be changed as far as the matching process can be performed.

In the example illustrated in FIG. 3, the locations of the cameras 41a and 41b in the direction of the optical axis Xa are substantially coincident with each other. In the example illustrated in FIG. 8, in the direction of the optical axis Xa, the second camera 41b is located closer to the subject (displaced in the subject direction or forward) by D1 than the first camera 41a. When the distance recognition system 100 uses a configuration such that the cameras 41a and 41b are offset in the direction of the optical axis Xa, it is desirable that at least any one of the sizes of the first image 51 and the second image 52 is corrected so as to make the sizes of the images 51 and 52 uniform and then the triangulation based on the corrected images is carried out.

As illustrated in FIG. 9, the distance recognition system 100 may use a configuration such that the optical axes Xa and Xb are not parallel to each other but the optical axes Xa and Xb intersect each other. In this case, in the triangulation, the distance information may be approximately calculated using a calculation expression assuming that the optical axes Xa and Xb are parallel to each other. However, this results in low accuracy. Therefore, it is desirable that a known calculation method as disclosed in "Proposal of Triangulation Method for Stereo Camera with Intersecting Optical Axes" is used.

The first and second images are acquired by the cameras 41a and 41b, respectively, but conversely, the first and second images may be acquired by the cameras 41b and 41a, respectively. In other words, the first image 51 may be acquired by either one of the camera 41a or the camera 41b, and the second image 52 may be acquired by the other of the camera 41a or the camera 41b.

In the preferred embodiments described above, the distance recognition system is used in a marine vessel equipped with an outboard motor, but the outboard motor may be replaced with another type of motor such as an inboard/outboard motor (stern drive or inboard motor/outboard drive), an inboard motor, and a water jet drive.

In the preferred embodiments described above, the terms with "substantially" are not intended to exclude completeness. For example, "substantially overlap", "substantially parallel", "substantially forward", and "substantially coincident" are respectively intended to include substantially or completely overlap, parallel, forward, and coincident.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A distance recognition system for use in a marine vessel, the distance recognition system comprising:
    at least one memory;
    a first imaging unit positioned on a hull so that an imaging area of the first imaging unit includes a water surface;
    a second imaging unit positioned on the hull at a location higher than a location of the first imaging unit and so that an imaging area of the second imaging unit includes the water surface; and
    at least one processor coupled to the at least one memory and configured or programmed to:
        acquire a first image captured by either one of the first imaging unit or the second imaging unit, and a second image captured by the other one of the first imaging unit or the second imaging unit;
        perform a matching process between the first image and the second image to acquire distance information about any position in the first image;
        determine an existence of waves based on the acquired distance information;
        recognize a water surface condition based on heights of a plurality of the waves that have been determined to exist;
        measure a height of a water surface at a predetermined distance from a hull of the marine vessel based on the acquired distance information; and
        output a notification indicating a change of the water surface height when the height of the water surface changes exceeding a threshold value for a predetermined period of time.

2. The distance recognition system according to claim 1, wherein the location of the first imaging unit and the location of the second imaging unit are substantially coincident with each other in a direction of an optical axis of the first imaging unit.

3. The distance recognition system according to claim 1, wherein the location of the first imaging unit and the location of the second imaging unit are substantially coincident with each other in a direction perpendicular to a direction of an optical axis of the first imaging unit and to a vertical direction of the hull.

4. The distance recognition system according to claim 1, wherein an imaging direction of the first imaging unit and/or an imaging direction of the second imaging unit is substantially forward of the hull.

5. The distance recognition system according to claim 1, wherein both the first imaging unit and the second imaging unit are located in an area which is, when viewed from a side of the hull, above a virtual straight line passing through an upper end of a bow of the hull and an upper end of a steering wheel provided on the hull.

6. The distance recognition system according to claim 1, wherein an optical axis of the first imaging unit and an optical axis of the second imaging unit are substantially parallel to each other.

7. The distance recognition system according to claim 1, wherein an optical axis of the first imaging unit and/or an optical axis of the second imaging unit defines an acute angle with a surface parallel to a deck of the hull, and that is below the surface and on a far side in an imaging direction of the first imaging unit and/or the second imaging unit.

8. The distance recognition system according to claim 1, wherein the matching process performed by the at least one processor is a stereo matching process.

9. The distance recognition system according to claim 1, wherein the at least one processor is further configured or programmed to:
   determine a condition of the plurality of waves based on a wave having a maximum height among the plurality of the waves or based on an average height of the plurality of the waves.

10. A marine vessel comprising:
    a hull; and
    a distance recognition system including:
      at least one memory;
      a first imaging unit positioned on a hull so that an imaging area of the first imaging unit includes a water surface;
      a second imaging unit positioned on the hull at a location higher than a location of the first imaging unit and so that an imaging area of the second imaging unit includes the water surface; and
      at least one processor coupled to the at least one memory and configured or programmed to:
        acquire a first image captured by either one of the first imaging unit or the second imaging unit, and a second image captured by the other one of the first imaging unit or the second imaging unit;
        perform a matching process between the first image and the second image to acquire distance information about any position in the first image;
        determine an existence of waves based on the acquired distance information;
        recognize a water surface condition based on heights of a plurality of the waves that have been determined to exist;
        measure a height of a water surface at a predetermined distance from a hull of the marine vessel based on the acquired distance information; and
        output a notification indicating a change of the water surface height when the height of the water surface changes exceeding a threshold value for a predetermined period of time.

11. A distance recognition system for use in a marine vessel, the distance recognition system comprising:
    at least one memory;
    a first imaging unit positioned on a hull so that an imaging area of the first imaging unit includes a water surface;
    a second imaging unit positioned on the hull at a location higher than a location of the first imaging unit and so that an imaging area of the second imaging unit includes the water surface; and
    at least one processor coupled to the at least one memory and configured or programmed to:
      acquire a first image captured by either one of the first imaging unit or the second imaging unit, and a second image captured by the other one of the first imaging unit or the second imaging unit;
      perform a matching process between the first image and the second image to acquire distance information about any position in the first image; and
      determine a plurality of reference areas using the first image, and perform a distance information acquisition process for the plurality of reference areas; wherein
    the at least one processor is further configured or programmed to, in the distance information acquisition process for each of the plurality of reference areas:
      use a position and size of each of the plurality of reference areas to define a search area in the second image, the search area extending in a direction corresponding to a direction in which the first imaging unit and the second imaging unit are arrayed;
      extract, from the search area, a matching area that matches the each of the plurality of reference areas;
      acquire a parallax between corresponding feature points in each of the plurality of reference areas and the matching area; and
      acquire a distance to the feature points as the distance information by triangulation using the parallax.

12. The distance recognition system according to claim 11, wherein the at least one processor is further configured or programmed to:
    in the determining of the plurality of reference areas using the first image, decrease in size reference areas among the plurality of reference areas within a first region of the first image in comparison with reference areas among the plurality of reference areas within a second region of the first image, wherein the second region is located below the first region in the first image.

13. The distance recognition system according to claim 11, wherein the at least one processor is further configured or programmed to:
    in the determining of the plurality of reference areas using the first image, increase in size image portions of the first image corresponding to reference areas among the plurality of reference areas within a first region of the first image in comparison with image portions of the first image corresponding to reference areas among the plurality of reference areas within a second region of the first image, the second region being located below the first region in the first image; and
    in defining the search area in the second image, change in size an image portion of the second image corresponding to the search area according to image portions corresponding to the reference areas.

14. A marine vessel comprising:
a hull; and
a distance recognition system including:
  at least one memory;
  a first imaging unit positioned on a hull so that an imaging area of the first imaging unit includes a water surface;
  a second imaging unit positioned on the hull at a location higher than a location of the first imaging unit and so that an imaging area of the second imaging unit includes the water surface; and
  at least one processor coupled to the at least one memory and configured or programmed to:
    acquire a first image captured by either one of the first imaging unit or the second imaging unit, and a second image captured by the other one of the first imaging unit or the second imaging unit;
    perform a matching process between the first image and the second image to acquire distance information about any position in the first image; and
    determine a plurality of reference areas using the first image, and perform a distance information acquisition process for the plurality of reference areas; wherein
  the at least one processor is further configured or programmed to, in the distance information acquisition process for each of the plurality of reference areas:
    use a position and size of each of the plurality of reference areas to define a search area in the second image, the search area extending in a direction corresponding to a direction in which the first imaging unit and the second imaging unit are arrayed;
    extract, from the search area, a matching area that matches the each of the plurality of reference areas;
    acquire a parallax between corresponding feature points in each of the plurality of reference areas and the matching area; and
    acquire a distance to the feature points as the distance information by triangulation using the parallax.

* * * * *